Aug. 25, 1964  J. D. BROOKS  3,145,679
ACOUSTIC TORPEDO WARHEAD AND TRANSDUCER APPARATUS
Filed Nov. 13, 1963
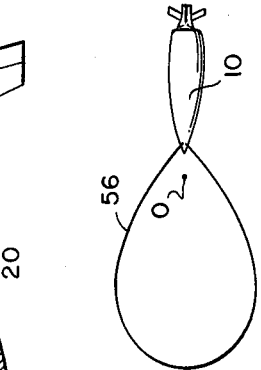
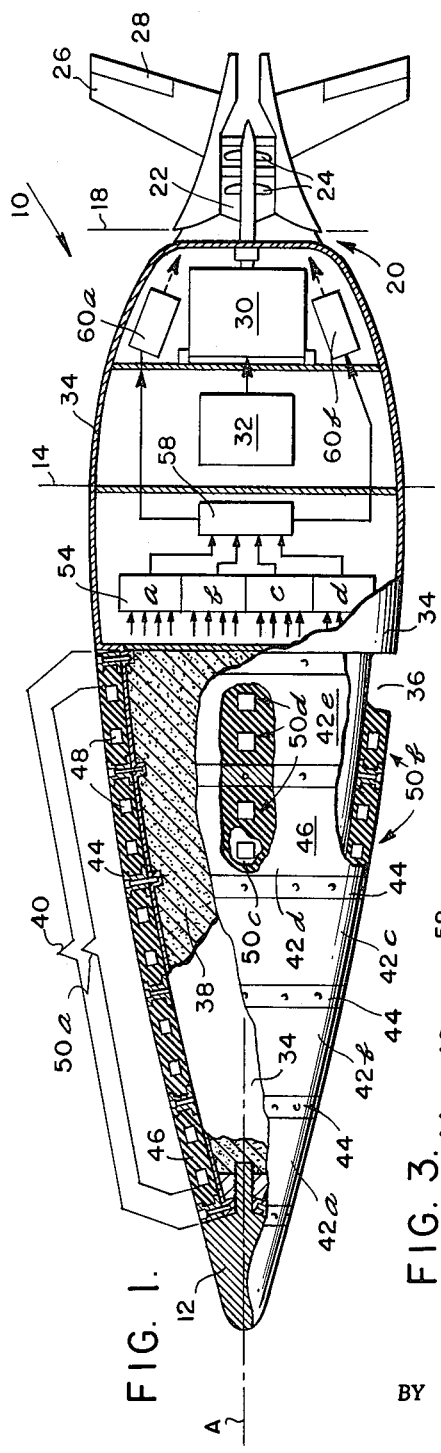
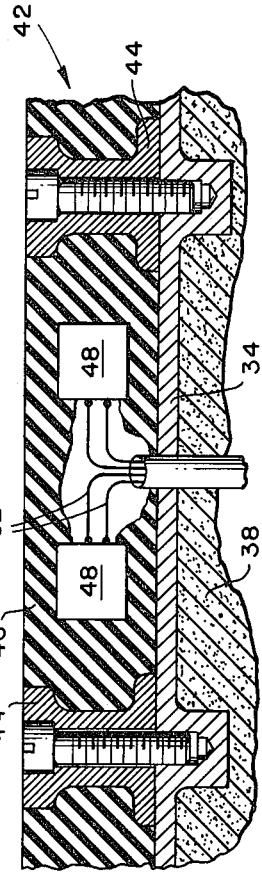
INVENTOR.
JOHN D. BROOKS
BY
ATTORNEY.

United States Patent Office 3,145,679
Patented Aug. 25, 1964

3,145,679
ACOUSTIC TORPEDO WARHEAD AND TRANSDUCER APPARATUS
John D. Brooks, Alhambra, Calif., assignor to the United States of America as represented by the Secretary of the Navy
Filed Nov. 13, 1963, Ser. No. 324,601
6 Claims. (Cl. 114—23)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in acoustic torpedoes and in transducer apparatus for same.

Two general types of directive transducer arrays for use in acoustic torpedoes are known. The first of these, which has been employed from the date of the earliest practical acoustic torpedoes, is the so-called "piston array" type in which individual "broadside" transducer elements are compactly clustered at a blunt frontal face of the torpedo. Piston arrays directively couple acoustic energy between the transducer elements and the water by the piston-like mode of vibration of each individual transducer element in the direction along which coupling is to be the greatest. A second type, which heretofore has not met with any appreciable success or come into practical use, is the "linear array" type which consists of individual transducer elements disposed in spaced relationship along the sides of the torpedo. Linear arrays have associated input circuitry and directive coupling is effected by electronically delaying and attenuating the output of the individual elements by different amounts and then combining the modified signals in such manner that wave fronts from the direction along which coupling is to be the greatest are augmented. In either of the two types of array, the transducer elements must be protected by a padding material, which also must have an acoustic impedance approximating that of seawater in order to provide a "window" through which the acoustic wave may pass between the seawater and the transducer elements.

The desired operational characteristics of the torpedo and convenience of manufacturing dictate which of the types of transducer apparatus may be employed. Piston type arrays are favored because of compactness and convenience of installation. The linear array is favored because of the larger area over which energy is coupled, which permits greater sensitivity. However, installation of the linear array is less convenient, and any practical installation would occupy a significantly larger proportion of the torpedo volume than the corresponding installation for a piston array.

The latter problem of occupying a larger proportion of the torpedo volume is particularly serious because of an acute problem in providing torpedoes which both have the desired operational characteristics for fast, mobile technique of delivery to the locality at which presence of a submerged enemy submarine is expected, and the necessary warhead capacity to destroy the submarine. Mobility and speed has been obtained by restricting the total weight and size of the torpedo to permit delivery by aircraft or rocket vehicles, and this in turn has proportionally reduced the space and weight carrying capacity which may be allocated to the warhead. On the other hand, improved design techniques for the hulls of submarines have made them more difficult to destroy by a given quantity of explosive. It therefore becomes apparent that the warhead capacity of the torpedo is one of its most critical operational characteristics in the present state of the art. In fact, extensive developmental work is presently being done in effort to increase warhead capacities by even relatively small percentages in the order of five to ten percent. Thus, prior to the present invention, linear type transducer arrays have been generally deemed to impose objectionable restrictions upon the explosive carrying capacity of a torpedo.

Accordingly, an object of the present invention is to provide improved transducer apparatus which does not objectionably reduce the explosive carrying capacity of the torpedo.

Another object is to provide improved apparatus in accordance with the previous objective which further is easy to manufacture and easy to install.

Another object is to provide a novel acoustic torpedo employing a transducer and warhead construction which permits use of a linear array without objectionably reducing the torpedo warhead capacity and which permits use of hydrodynamically optimum body forms.

Other objects and many of the attendant advantages of this invention will be readily appreciated as the same becomes better understood by reference to the following detained description when considered in connection with the accompanying drawings wherein:

FIG. 1 is a side view, partly in section, of a torpedo, with some components shown in block diagram form, FIG. 2 is an idealized pressure distribution plot of the static pressure relative to that of ambient static pressure along the surface of the torpedo of FIG. 1, FIG. 3 is an enlarged detail of a portion of FIG. 1, and FIG. 4 is a generalized polar plot of the directive coupling characteristics of the transducer device of FIG. 1.

Referring now to the drawing and in particular to FIG. 1, the subject of the invention is illustrated in connection with a homing torpedo 10 having a passive guidance control system and having a body form providing hydrodynamic characteristics to maintain laminar flow along its hull. Such a torpedo is intended for delivery by a rocket, such as the ASROC missile disclosed in copending application Serial No. 8,201, filed February 11, 1960, and entitled "Rocket Thrown Missile." Alternatively, delivery may be by aircraft. More particularly, the torpedo is intended for use in shallow water where a passive guidance system is desired because of reverberation effects in the shallow water.

The body form of torpedo 10 is circular in section about a longitudinal axis A at all points along its length. The forward section of the body gradually increases in diameter from a generally pointed nose 12 to a transverse reference station 14, at which the diameter of the torpedo is maximum, located at a distance approximately two-thirds along the length of the torpedo. In addition to the taper, the hull is shaped to form a slight outward convex surface of revolution about axis A having decreasing curvature in the rearward direction between the nose and transition point 14. The taper and curvature are chosen to provide a continuously decreasing pressure distribution of static pressure along this region of the hull as illustrated in FIG. 2 by curve 16, which is an idealized plot of pressure distribution at various points along the hull of the torpedo. The precise hull shape may be determined by conventional experimental techniques employing a water tunnel investigation or by conventional analytical design techniques, or a combination of the water tunnel and analytical methods. Behind reference station 14, the diameter decreases in a rearward direction, at first forming an outwardly convex surface of revolution which extends rearwardly to another transverse reference station 18, and then forming a concave outwardly surface of revolution tapering to a stern point. The latter surface of revolution is also known as a cusp. Propulsion is preferably provided by a pump jet arrangement including a circumferential intake 20 leading to an axial channel 22 containing multi-stage pump blades 24 which eject a rearwardly directed jet of water to propel the torpedo. The tail is also provided with conventional horizontal (not shown) and vertical stabilizing fins 26 containing elevator (not shown) and rudder steering surfaces 28. The pump-jet blades are driven by an electric motor 30 mounted in the most rearward compartment, powered by a battery 32 in the compartment ahead. The reference station 14, corresponding to the maximum diameter of the torpedo, may be disposed at any distance behind the nose within the approximate limits between one-half (½) and two-thirds (⅔) the total length of the torpedo, by proper selection of the tapered surface ahead of reference station 14.

A conventional pressure wall 34 encloses the internal compartment of the torpedo. In the forward portion of the torpedo, pressure wall 34 is shaped to form an annular recessed space 36 extending from just aft of the nose to a position somewhat ahead of the body form station 14, and the internal compartment surrounded by the recessed space contains the main explosive charge 38. Set within recessed space 36 is an explosive charge and linear transducer array device 40 consisting of a series of annular molded sections 42a, b, c, d and e, secured in place by attachment rings 44 bolted to the pressure hull. Referring now to FIG. 3 in conjunction with FIG. 1, each molded section 42 is composed of a body member made of a moldable amorphous mass consisting of a high explosive material and a rubbery binder material, and a plurality of individual transducer elements 48 integrally molded within the body member. Each transducer element is imbedded within the body member with a layer of the body member material separating it from seawater. The binder material is so chosen that body 46 has approximately the same impedance to acoustic waves as does sea water, this quality being associated with a rubbery texture and known in the transducer art as a "rho-C" quality. The high explosive material is chosen to be safe under service handling of the torpedo and under water entry shock experienced during an air drop, and to detonate under the explosive force of main charge 38. A preferred binder material for body member 46 utilizes the binder of a typical nitrasol rocket propellant which is the name for a group of propellants developed at the U.S. Naval Ordnance Test Station, China Lake, California, and which are described in patent application Serial No. 761,448, filed September 16, 1958. Briefly, the binder for Nitrosol propellant consists of a mixture of from about 15 to 85 percent high energy plasticizer, 0 to 20 percent inert plasticizer, and about 10 to 50 percent plastisol nitrocellulose. The high energy plasticizer is one selected from the group consisting of primary and secondary nitrate esters both liquid and solid. The nitrocellulose is converted to tiny hard spheres (of the order of 10 microns diameter) which are suspended at elevated temperatures in a plasticizer to form a rubbery binder. The high explosive may be of any suitable type which has been transformed from crystalline materials by solvent treatments into amorphous products, and is chosen to be safe under handling of the torpedo, but which will be detonated under the explosive force of main charge 38. An alternative material for body member 46 is one or more of the well known fluorocarbon compounds, chosen to most nearly have the desired acoustic quality.

Within each section 42 the transducer elements 48 are disposed in the body member 46 in such geometric relationship that when mounted on the torpedo the individual elements form four linear transducer arrays 50a, b, c and d, extending generally in a longitudinal direction along the portion of the torpedo ahead of station 14 and disposed along the top, bottom, and left and right side, respectively, of the torpedo. These arrays form the well known four inputs generally corresponding to up, down, left and right steering signals for guidance in azimuth and elevation. The leads 52, FIG. 3, from each transducer element are coupled to the interior of the hull by a suitable pressure tight electrical interconnecting device, which for purposes of simplicity has been illustrated as an ordinary tube. In accordance with the conventional manner of utilizing a linear array, individual fixed delay and attenuation circuits 54a, b, c and d (shown in the compartment behind the main charge) are provided for each respective array, and the outputs from the individual transducer elements in each array are separately applied to the corresponding delay and attenuation circuit. Within circuit 54, each input is individually delayed and attenuated and then combined in such a manner as to augment sound wave fronts from a source ahead of the torpedo and to suppress wave fronts from sources in other directions. The aggregate effect of the four linear arrays and their corresponding delay and attenuation circuits is to provide a combined pattern of directivity of coupling of sound in accordance with polar plot, FIG. 4, having a maximum sensitivity along the axis of the torpedo. For a further description of the mode of operation of linear transducer areas for torpedos, reference is made to U.S. Patent 2,409,632 of R. W. King, entitled "Guiding Means for Self-Propelled Torpedos." The output from circuits 54a, b, c and d are applied to a suitable guidance control apparatus 56 which derives the actual steering control signal, and which per se forms no part of the invention and therefore its detailed illustration is deemed unnecessary. From guidance control apparatus 58, output signals are applied through suitable steering control circuits (not shown) to azimuth and elevation steering actuators 60a and 60b which control the position of the rudder and elevator steering surfaces 28 in the fins. Although only the four basic sets of array 50 have been illustrated, it is to be understood that additional sets of arrays may be disposed in the various angular positions about the torpedo axis intermediate the basic four, in order to increase the sensitivity of array device 40.

As may now be apparent, the present invention as disclosed and described herein, incorporates for a torpedo installation a linear transducer array device 40 in which the body member 46, serving as the acoustic window and as a rubbery padding, additionally serves to augment the explosive force of the main warhead. Thus the serious objection to the use of linear array devices on the grounds that it restricts the explosive carrying capacity, is to a large extent overcome by the described structure. Additionally, array device 40 is utilized to form a hydrodynamic body form which maintains laminar flow over the sensitive surfaces of the transducer, which in turn reduces the amount of noise introduced into the guidance apparatus. Also, it should be noted that the disclosed materials from which the body member 46 may be made are moldable, facilitating manufacture of device 40 in integrally molded units which are convenient to install.

Obviously many modifications and variations of the present invention are possible in the light of the above teachings. It is therefore to be understood that within the scope of the appended claims the invention may be practiced otherwise than as specifically described.

What is claimed is:

1. In transducer apparatus for use in an acoustic torpedo having a high explosive warhead,
    (a) a transducer element,
    (b) an acoustic window medium disposed between the transducer element and the water medium to couple acoustic energy between the transducer element and the water medium, the improvements, in combination, comprising;
    (c) said window medium being made of an explosive material forming an amorphous mass including a rubbery binder chosen to provide an acoustic impedance which approximates that of the water medium and including a high explosive chosen to be safe under normal handling of the torpedo and to detonate in response to explosion of the warhead to thereby augment its explosive capacity.

2. Apparatus in accordance with claim 1, (d) the explosive material further being moldable material and said transducer element being moldingly imbedded in same.

3. In combination with an acoustic torpedo having a warhead,
   (a) said torpedo having a hull including a longitudinally extending portion having its exterior surface formed, at least in part, from a rubbery high explosive layer made of a material having the combined property of being a high explosive chosen to augment the explosive force of the warhead and having a rubbery consistency such that acoustic energy may be coupled between same and the water medium without distortion,
   (b) a plurality of transducer elements disposed inwardly of said layer and in acoustic energy coupling relationship thereto,
       each transducer element of said plurality being operative to individually convert acoustic signals emanating from the locus of a target and impinging upon the rubbery high explosive layer to an electrical output,
       said transducer elements being disposed at axially and angularly spaced positions along and about the torpedo to form a set of linear longitudinally extending transducer arrays having predetermined pattern of directional sensitivity, and
   (c) torpedo guidance means responsive to the individual outputs of the transducer elements from each linear array of said directional set of arrays for steering the torpedo along a homing course toward the locus of the target.

4. The combination in accordance with claim 3,
   (d) said hull having a maximum diameter disposed between one-half and two-thirds the distance along its length and being continuously outwardly tapered from the nose to said maximum diameter,
       to cause a decreasing ambient water pressure distribution along the hull from its nose to its maximum diameter,
   (e) said longitudinally extending portion of the hull containing the rubbery high explosive layer and the transducer elements being disposed between the nose and maximum diameter,
       whereby turbulent flow of water along the exterior surface of the hull through which acoustic energy is coupled is inhibited to reduce the amount of flow noise introduced into the guidance means.

5. The combination in accordance with claim 4,
   (f) said guidance control means being of the passive type which causes the torpedo to home toward a target in response to an acoustic signal generated by the target.

6. The combination in accordance with claim 3, said acoustic torpedo being of the type dropped into the water from an air-flight vehicle,
   (g) said rubbery high explosive layer further serving as the padding to protect the transducer elements against water entry shock.

References Cited in the file of this patent

UNITED STATES PATENTS 2,409,632     King  ---------------- Oct. 22, 1946